(12) United States Patent
Lee et al.

(10) Patent No.: US 8,378,640 B2
(45) Date of Patent: Feb. 19, 2013

(54) CHARGING CIRCUIT WITH APPLICATION SYSTEM THEREOF

(75) Inventors: Li-Wei Lee, Zhubei (TW); Nien-Hui Kung, Hsinchu (TW); Kwan-Jen Chu, Hsinchu (TW); Hsuan-Kai Wang, Banqiao (TW)

(73) Assignee: Richtek Technology Corp., ChuPei (TW)

( * ) Notice: Subject to any disclaimer, the term of this patent is extended or adjusted under 35 U.S.C. 154(b) by 588 days.

(21) Appl. No.: 12/631,988

(22) Filed: Dec. 7, 2009

(65) Prior Publication Data

US 2011/0012565 A1    Jan. 20, 2011

(30) Foreign Application Priority Data

Jul. 9, 2009    (TW) ................................. 98212495 U

(51) Int. Cl.
*H02J 7/00*    (2006.01)
*H02J 7/04*    (2006.01)
*H02J 7/24*    (2006.01)

(52) U.S. Cl. ........ 320/163; 320/127; 320/128; 320/132; 320/134; 320/152

(58) Field of Classification Search .................. 320/163
See application file for complete search history.

(56) References Cited

U.S. PATENT DOCUMENTS

2010/0264882 A1*  10/2010  Hartular et al. ............... 320/139

\* cited by examiner

*Primary Examiner* — Edward Tso
*Assistant Examiner* — Ahmed Omar

(57) ABSTRACT

A charging circuit with an application system thereof provides an error amplifier to control a transistor switch for controlling the charging power source to charges the battery. When the voltage difference between the power source and load terminals of the transistor switch drops along with the transistor switch being turned on, the output voltage of the error amplifier changes as well to increase the turning-on resistance of the transistor switch such that the voltage difference between the power source and load terminals is capable of maintaining at a value above a certain reference level for avoiding the unstable state resulting from the charging circuit being turned on and off frequently.

8 Claims, 3 Drawing Sheets

CHARGING CIRCUIT WITH APPLICATION SYSTEM THEREOF

BACKGROUND OF THE INVENTION

1. Field of the Invention

The present invention is related to a charging circuit, and particularly to a charging circuit with an application system capable of preventing from the circuit being frequently turned on and off.

2. Brief Description of the Related Art

The application of the power supply circuit employed in the field of the power generation with the solar energy usually provides a charging circuit to charge the battery for storing the superfluous electric power generated from the solar energy. When the generated power is insufficient at night or on the cloudy day, the stored power can be supplied to the load to achieve the purpose of power regulation.

Please referring to FIG. 1, the conventional charging circuit application system is illustrated. It can be seen in FIG. 1 that the charging circuit utilizes the output voltage $V_C$ of the comparator 14, which connects with the gate of the PMOS field effect transistor 12, to control if the PMOS field effect transistor 12 is in a state of being turned on to attain the purpose of controlling the charging power source 11 charging the battery 13. When the voltage $V_{IN}$ of the charging power source 11 gradually increases as shown in FIG. 2 to a state of the voltage difference $V_{1-B}$ between the source voltage $V_I$ and the drain voltage $V_B$ of the PMOS field effect transistor 12 being higher than the preset upper limit voltage $V_{RT}$, the PMOS field effect transistor 12 is controlled by the output voltage $V_C$ of the comparator 14 to be turned on and start charging.

Meanwhile, the voltage divisions of the wire resistors 15, 16 allow the voltage difference $V_{1-B}$ entering the two input ends of the comparator 14 drops. Assume the resistance of the respective resistor 15, 16 is $R_{WIRE}$, and the turning-on resistance of the PMOS field effect transistor 12 is $R_{CHG}$, then the voltage difference $V_{1-B}$ is expressed in the following equation (1):

$$V_{1-B} = R_{CHG} \times \frac{V_{IN} - V_{BAT}}{R_{WIRE} + R_{CHG} + R_{WIRE}} \quad (1)$$

When the voltage difference $V_{1-B}$ drops to the lower limit voltage $V_{FT}$, PMOS field effect transistor 12 is turned off due to being controlled by the output voltage $V_C$ of the comparator 14. This unstable state continues till the condition of the following equation (2) is reached. Hence, the preceding circuit is deficient.

$$V_{IN} > \frac{R_{WIRE} + R_{CHG} + R_{WIRE}}{R_{CHG}} \times V_{FT} + V_{BAT} \quad (2)$$

SUMMARY OF THE INVENTION

Accordingly, an object of the present invention is to provide a charging circuit with an application system capable of preventing the circuit from the unstable state resulting from being frequently turned on and off.

In order to achieve the preceding object, the charging circuit with an application system thereof according to the present invention comprises a charging power source, a battery and a charging circuit capable of controlling the operation of charging; the charging circuit comprises a transistor switch and an error amplifier.

Wherein, the transistor switch has a power source terminal coupling with the charging power source, a load terminal coupling with the battery, and a gate terminal; the error amplifier has a first input end, a second input end and an output end, the first input end coupling with the power source terminal, the second input end coupling with the load terminal, and the output end coupling with the gate terminal for controlling the turning-on resistance of the transistor switch in accordance with a voltage difference between the power source terminal and said load terminal such that the voltage difference is capable of maintaining at a value above a reference level for controlling the charging power source to charge the battery.

According to a preferred embodiment of the present invention, the error amplifier of the charging circuit comprises a gate control amplifier having the first input end, the second input end, and a control end for amplifying the voltage difference and output a control voltage via the control end; a first current source being a constant current source and coupling with the power source terminal and the gate terminal; and a second current source coupling with the control end, the gate terminal, and a ground end to control the current of the second current source by means of said control voltage such that the turning-on resistance of the transistor can be controlled substantively.

According to a preferred embodiment of the present invention, the transistor switch of the charging circuit is a PMOS field effect transistor or a NMOS field effect transistor.

As the foregoing, a charging circuit with an application system thereof according to the present invention utilizes the error amplifier capable of controlling the turning-on resistance of the transistor switch via the voltage difference between the power source terminal and the load terminal of the transistor switch as the control circuit for the charging power source charging the battery such that the turning-on resistance of the transistor switch can be increased under a condition of the increase of the charging power source before reaching a certain reference level so as to prevent the circuit from being in the unstable state resulting from being turned on and off frequently.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
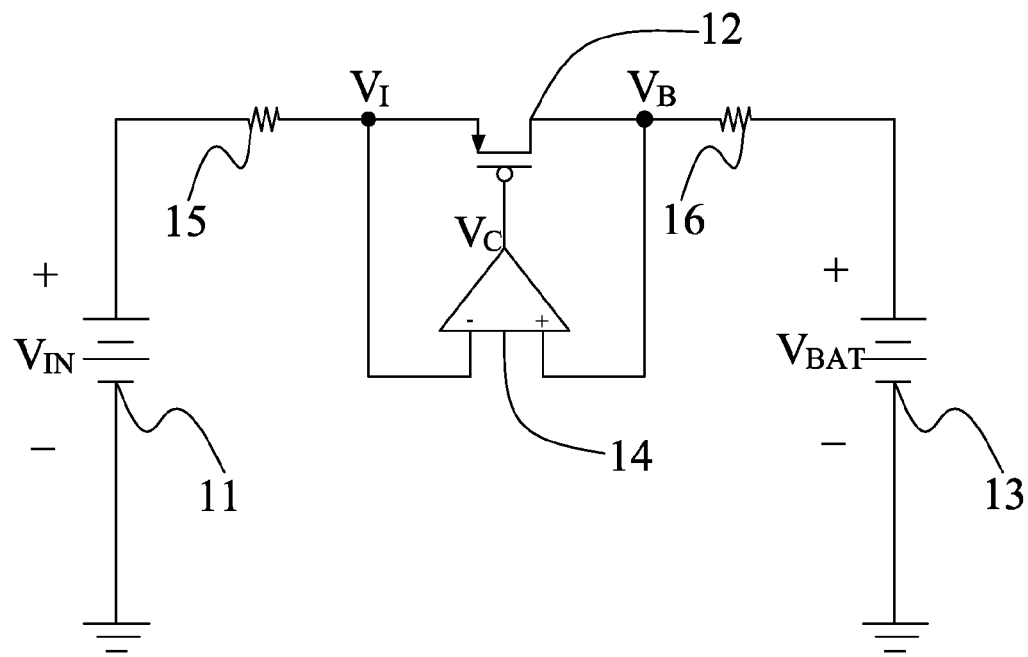
FIG. 1 is a circuit diagram illustrating the conventional charging circuit application system.
Figure 2:
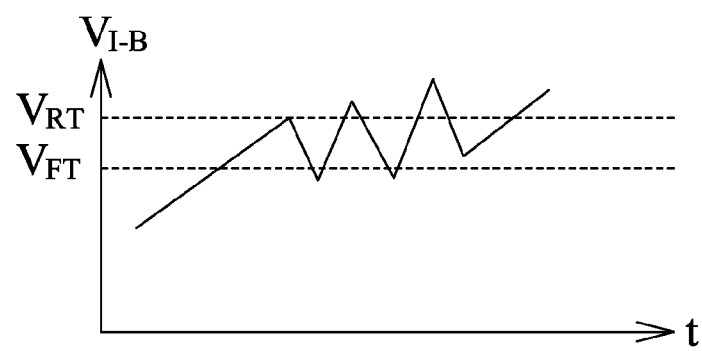
FIG. 2 is a graph illustrating the operational wave shape of the charging circuit application system shown in FIG. 1.
Figure 2:
Figure 3:
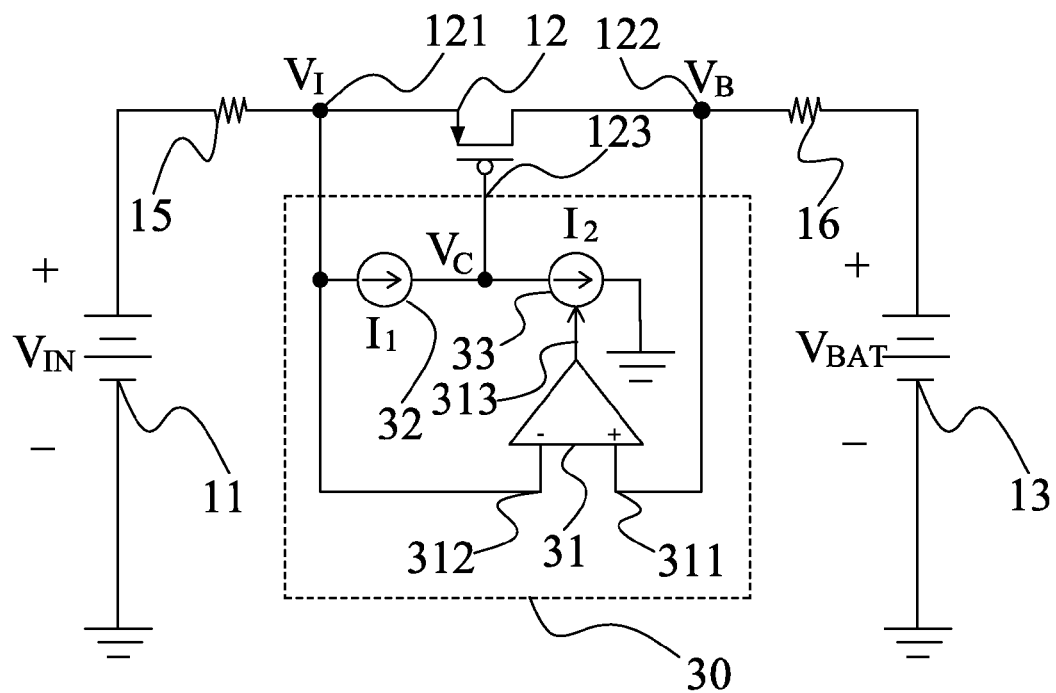
FIG. 3 is a circuit diagram illustrating a preferred embodiment of the charging circuit application system according to the present invention.

Referring to FIG. 3, a charging circuit application system of a preferred embodiment according to the present invention is illustrated. The charging circuit application system comprises a charging circuit, which is composed of a transistor switch such as the transistor gate of a PMOS field effect transistor 12, and an error amplifier 30, in addition to the charging power source 11 and the battery 13. The PMOS field effect transistor 12 has a power source terminal 121 coupling with the charging power source 11, a load terminal 122 coupling with the battery 13, and a gate terminal 123. The error amplifier 30 has an output end coupling with the gate terminal 123 of the PMOS field effect transistor 12 in addition to a positive input end 311 and a negative input end 312. The function of the error amplifier 30 is to amplify the voltage difference $V_{I-B}$ between the power source terminal 121 and the load terminal 122 for controlling ON-state resistance of the PMOS field effect transistor 12 and further controlling the charging power source 11 to charge the battery 13.

The error amplifier 30 shown in FIG. 3 comprises a gate control amplifier 31 and two current sources 32, 33. The gate control amplifier 31 provides a control end 313 in addition to the positive input end 311 and the negative input end 312. The negative input end 312 couples with the power source terminal 121 of the PMOS field effect transistor 12 and the positive input end 311 couples with the load terminal 122 of the PMOS field effect transistor 12. The current source 32 is a constant current source and couples with the power source terminal 121 and the gate terminal 123 of the PMOS field effect transistor 12. The current source 33 couples with the control end 313 of the gate control amplifier 31, the gate terminal 123 of the PMOS field effect transistor 12 and the ground end respectively.

Figure 4:
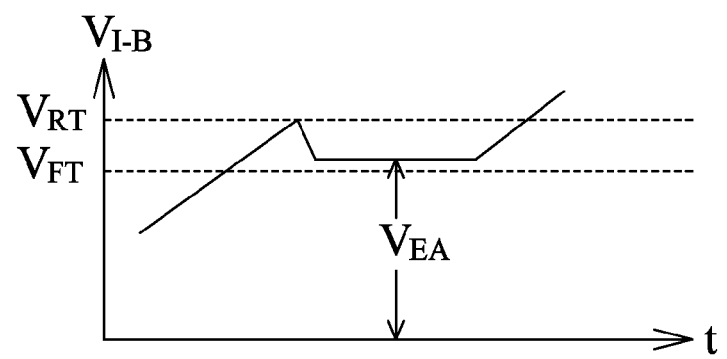
FIG. 4 is a graph illustrating the operational wave shape of the charging circuit application system shown in FIG. 3.

Referring to FIG. 4 in company with FIG. 3, when the voltage $V_{IN}$ of the charging power source 11 increases gradually as shown in FIG. 4 to a state of the voltage difference $V_{I-B}$ between the voltage $V_1$ of the power source terminal 121 and the voltage $V_B$ of the load terminal 122 of the PMOS field effect transistor 12 being greater than a preset upper limit voltage $V_{RT}$, the PMOS field effect transistor 12 becomes in a state of ON to start the operation of charging under the control of the voltage $V_C$ output from the error amplifier 30. Although the voltage difference $V_{1-B}$, which enters the positive input end 311 and the negative input end 312, has dropped due to the division voltages of the wire resistors 15, 16, it still maintains at a voltage reference level $V_{EA}$ greater than the low limit voltage $V_{FT}$ for shutting off the PMOS field effect transistor 12. The operation principle for the preceding charging circuit is explained hereinafter.

As the preceding description, when the PMOS field effect transistor 12 is in a state of ON, the voltage difference $V_{I-B}$ between the voltage $V_I$ of the power source terminal 121 of the PMOS field effect transistor 12 and the voltage $V_B$ of the load terminal 12 of the PMOS field effect transistor 12 decreases. Thus, the current from the current source 33 becomes decreased along with the decrease of the output voltage of the control end 313 of the gate control amplifier 31. In this way, it is capable of adapting to the constant current of the current source 32 to maintain the voltage difference $V_{1-B}$ above the voltage reference level $V_{EA}$ by means of increasing the voltage of the gate terminal 123 of the PMOS field effect transistor 12 and then increase the ON-state resistance of the PMOS field effect transistor 12. Under this circumference, the unstable state concerning the conventional circuit being frequently OFF and ON is incapable of being met.

Figure 5:
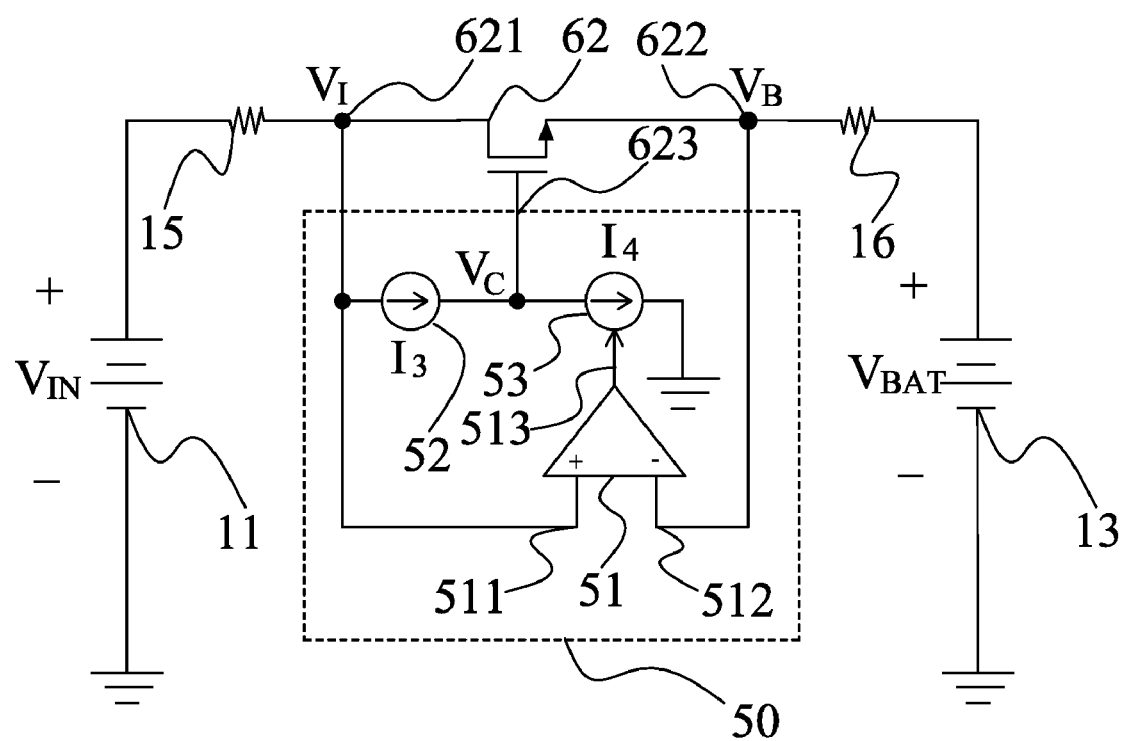
FIG. 5 is a diagram illustrating another embodiment of the charging circuit application system according to the present invention.

Please referring to FIG. 5, a charging circuit application system or another preferred embodiment according to the present invention is illustrated. Similarly, the charging circuit application system of the second embodiment includes a charging power source 11, a charging circuit, and a battery 13. The difference of the second embodiment from the preceding first embodiment is in that the charging circuit is composed of a NMOS field effect transistor 62 and an error amplifier 50.

The NMOS field effect transistor 62 shown in FIG. 5 includes a power source terminal 621 coupling with the charging power source 11, a load terminal 622 coupling with the battery 13 and a gate terminal 623. The error amplifier 50 has an output end coupling with the gate terminal 623 of the NMOS field effect transistor 62 in addition to a positive input end 511 and a negative input end 512. The function of the error amplifier 50 is to amplify the voltage difference $V_{I-B}$ between the power source terminal 621 and the load terminal 622 of the NMOS field effect transistor 62 for controlling ON-state resistance of the NMOS field effect transistor 62 and further controlling the charging power source 11 to charge the battery 13.

The error amplifier 50 shown in FIG. 5 comprises a gate control amplifier 51 and two current sources 52, 53. The gate control amplifier 51 provides a control end 513 in addition to the positive input end 511 and the negative input end 512. The positive input end 511 couples with the power source terminal 621 of the NMOS field effect transistor 62 and the negative input end 512 couples with the load terminal 622. The current source 52 is a constant current source and couples with the power source terminal 621 and the gate terminal 623 of the NMOS field effect transistor 62. The current source 53 couples with the control end 513 of the gate control amplifier 51, the gate terminal 623 of the NMOS field effect transistor 62 and the ground end respectively.

Similarly, referring to FIG. 4 again in company with FIG. 5, when the voltage $V_{IN}$ of the charging power source 11 increases gradually as shown in FIG. 4 to a state of the voltage difference $V_{1-B}$ between the voltage $V_1$ of the power source terminal 621 and the voltage $V_B$ of the load terminal 622 of the NMOS field effect transistor 62 being greater than a preset upper limit voltage $V_{RT}$, the NMOS field effect transistor 62 becomes in a state of ON to start the operation of charging under the control of the output voltage $V_C$ being sent out from the error amplifier 50. Although the voltage difference $V_{1-B}$, which enters the positive input end 511 and the negative input end 512, may drop due to the division voltages of the wire resistors 15, 16, it still maintains at a voltage reference level $V_{EA}$ greater than the low limit voltage $V_{FT}$ that is for shutting off the NMOS field effect transistor 12. The operation principle for the preceding charging circuit is explained hereinafter.

As the preceding description, when the NMOS field effect transistor 62 is in a state of ON, the voltage difference $V_{I-B}$ between the voltage $V_1$ of the power source terminal 621 and the voltage $V_B$ of the load terminal 622 of the NMOS field effect transistor 62 decreases. Thus, the current from the current source 53 becomes increased along with the decrease of the output voltage of the control end 513 of the gate control amplifier 51. In this way, it is capable of adapting to the constant current of the current source 52 to maintain the voltage difference $V_{1-B}$ above the voltage reference level $V_{EA}$ by means of decreasing the voltage of the gate terminal 623 of the NMOS field effect transistor 62 and then increase the ON-state resistance of the NMOS field effect transistor 62. Under this circumference, the unstable state resulting from the conventional circuit being frequently OFF and ON is incapable of being met.

While the invention has been described with referencing to a preferred embodiment thereof, it is to be understood that modifications or variations may be easily made without departing from the spirit of this invention, which is defined by the appended claims.

What is claimed is:

1. A charging circuit suitable for controlling a charging power source to charge a battery comprising:
   a transistor switch having a power source terminal, a load terminal and a gate terminal with the power source terminal and the load terminal coupling with said charging power source and said battery respectively, wherein there is a voltage difference between the power source terminal and the load terminal, and a turning-on resistance in the transistor switch; and
   an error amplifier having a first input end, a second input end and an output end to couple with said power source terminal, said load terminal, and said gate terminal respectively;
   wherein the turning-on resistance is controlled by the error amplifier in accordance with the voltage difference so as to maintain said voltage difference above a reference level.

2. The charging circuit as defined in claim 1, wherein said error amplifier further comprises:
   a gate control amplifier having said first input end, said second input end, and a control end for amplifying said voltage difference and output a control voltage via said control end;
   a first current source being a constant current source and coupling with said power source terminal and said gate terminal; and
   a second current source coupling with said control end, said gate terminal, and a ground end to control the current of said second current source by means of said control voltage.

3. The charging circuit as defined in claim 1, wherein said transistor switch is PMOS field effect transistor.

4. The charging circuit as defined in claim 1, wherein said transistor switch is NMOS field effect transistor.

5. A charging circuit application system comprising:
   a charging power source;
   a battery;
   a transistor switch having a power source terminal, a load terminal and a gate terminal with the power source terminal and the load terminal coupling with said charging power source and said battery respectively, wherein there is a voltage difference between the power source terminal and the load terminal, and a turning-on resistance in the transistor switch; and
   an error amplifier having a first input end, a second input end and an output end to couple with said power source terminal, said load terminal, and said gate terminal respectively;
   wherein the error amplifier controls the turning-on resistance in accordance with the voltage difference so as to maintain said voltage difference above a reference level.

6. The charging circuit application system as defined in claim 5, wherein said error amplifier further comprises:
   a gate control amplifier having said first input end, said second input end, and a control end for amplifying said voltage difference and output a control voltage via said control end;
   a first current source being a constant current source and coupling with said power source terminal and said gate terminal; and
   a second current source coupling with said control end, said gate terminal, and a ground end to control the current of said second current source by means of said control voltage.

7. The charging circuit application system as defined in claim 5, wherein said transistor switch is PMOS field effect transistor.

8. The charging circuit application system defined in claim 5, wherein said transistor switch is NMOS field effect transistor.

* * * * *